(No Model.)
G. M. GITHENS.
CHANNELING TOOL FOR ROCKS.
No. 479,499. Patented July 26, 1892.
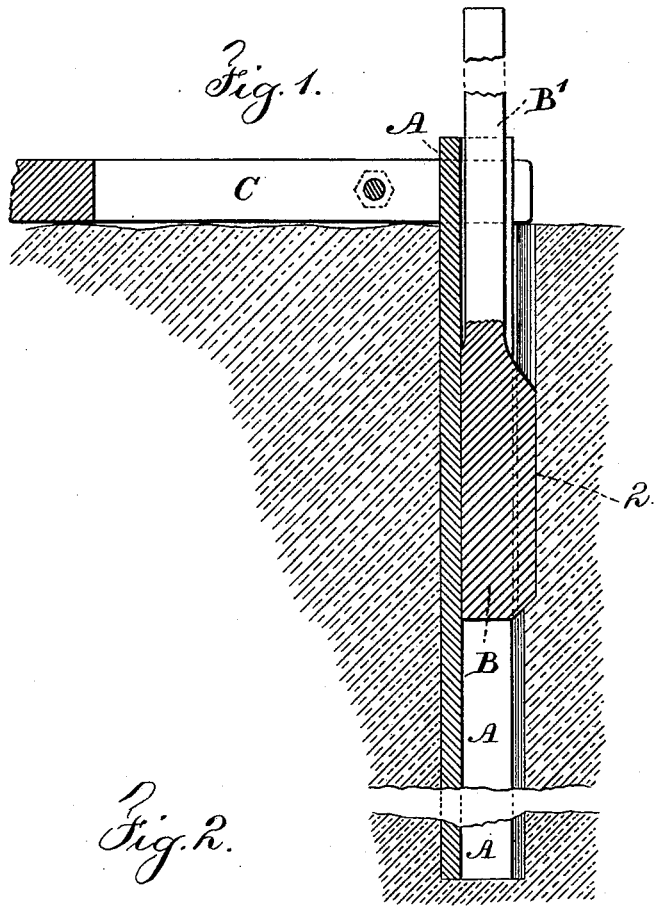
Fig. 1.
Fig. 3.
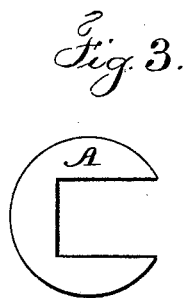
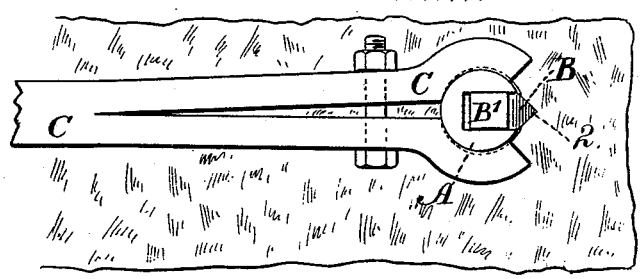
Fig. 2.
Witnesses
Chas. H. Smith
J. Staib
Inventor.
George M. Githens.
per Lemuel W. Serrell
atty
THE NORRIS PETERS CO., PHOTO-LITHO., WASHINGTON, D. C.

UNITED STATES PATENT OFFICE.

GEORGE M. GITHENS, OF BROOKLYN, NEW YORK.

CHANNELING-TOOL FOR ROCKS.

SPECIFICATION forming part of Letters Patent No. 479,499, dated July 26, 1892.

Application filed September 19, 1891. Serial No. 406,253. (No model.)

*To all whom it may concern:*

Be it known that I, GEORGE M. GITHENS, a citizen of the United States, residing at Brooklyn, in the county of Kings and State of New York, have invented an Improvement in Channeling-Tools for Rocks, of which the following is a specification.

In rock-drilling it has been heretofore usual to drill a circular hole and to channel the rock at opposite sides of such hole, and in some instances the drill has been shaped elliptically at the end with parallel sides and a flat end for disintegrating the rock by the successive blows, a drill of this character being represented in my patent, No. 371,679.

Difficulty has been experienced in properly guiding the channeling-tool because inequalities in the hardness of the rock may divert the channeling-tool, and when the explosion takes place the line of cleavage is liable to follow the inequalities in the channels instead of approximating a plane.

The object of the present invention is to insure accuracy in the action of the channeling-tool that is made use of in channeling the rock at one side of a hole drilled therein.

In the drawings, Figure 1 is a vertical section representing the rock with a hole drilled in it and with the channeling-tool in position. Fig. 2 is a plan view of the parts shown in Fig. 1, and Fig. 3 is a plan view of the tool-guide in larger size.

Any suitable mechanism is made use of for drilling the rock with an ordinary round hole, and this may be vertical, horizontal, or at an inclination, and after the hole has been drilled to the proper depth I introduce into the same a tool-guide A, formed of a bar having a longitudinal channel at one side thereof. This bar is preferably round and of a size to fit loosely into the hole drilled in the rock, and the longitudinal channel at one side of this bar is sufficiently deep to receive and guide the channeling-tool B, having a shank B'. This channeling-tool is preferably flat with a V-shaped edge 2, that is parallel to the back of the channeling-tool, and the lower end of this channeling-tool may either be square or at an inclination, and the shank of the channeling-tool is sufficiently long to reach up to the end of the drill-hole in the rock.

It is advantageous to have a series of these channeling-tools with shanks of different lengths, so that a channeling-tool with the shortest shank can be introduced into the channel in the guide-bar A and driven down into the hole drilled in the rock by a sledge-hammer struck upon the upper end of the shank of the tool, and in so doing the channeling-tool is accurately guided by the bar A and it cuts a channel in the rock which is straight and regular in consequence of the groove in the guide-bar directing such channeling-tool, and after the same has been driven the desired distance it can be withdrawn and another channeling-tool introduced with a longer shank, so as to be more conveniently driven toward the end of the hole drilled in the rock, and in this manner a channel of any desired length can be accurately cut, after which the guide-bar and the tool are to be withdrawn, and a second channel can be cut, if required, in the opposite face of the drill hole or at any desired intermediate point or angle. In all cases the guide-bar holds the channeling-tool so near to the place where it is acting upon the rock that there is no risk of the metal springing or the tool becoming diverted from a straight line.

It is advantageous to have guide-bars of different sizes for different sizes of holes, but one size of guide-bar may be used for different holes in cases where the channeling-tool is adapted to extend from the grooved side of the guide-bar and cut the proper depth of channel in the rock.

The channeling-tools made use of by me are very cheap to construct, as they can be cut out from a plate or bar of steel and the shank-bar welded to the same, and the tool can be tempered with accuracy, whereas in cases where a channeling-tool is made to fill the hole in the rock the mass of metal is difficult to temper and it is expensive to construct or to keep in order, and the tool is liable to be deflected by seams and inequalities in the rock, and hence the channel is not straight and the line of cleavage is imperfect.

Usually the wedging action of the channeling-tool against the rock will hold the guide-bar firmly in its proper position in the drill-hole, but when desired a clamp of any character may be applied to the guide-bar where it projects above the rock. I have shown a clamp C, adapted to lie upon the rock and to grasp the guide-bar by screwing up the bolt, and the workman can hold this clamp by his foot while driving the channeling-tool.

I do not claim a guide for channeling-tools formed of a tube with slots at opposite sides throughout its length, the channeling-tool being made with two cutting ends or edges. In consequence of my guide-bar having a slot the bar is much stiffer and the channeling-tool pressing the bar against the rock aids in holding the same firmly in its position while the tool is being guided by such bar, and the channeling-tool cannot become displaced transversely to the guide-bar, as may be the case when such channeling-tool has two cutting ends and may be moved endwise in consequence of differences in the condition or hardness of the rock.

I claim as my invention—

1. The combination, with a channeling-tool having one projecting cutting-edge, of a guide-bar having a longitudinal channel at one side thereof and adapted to pass into a drill-hole, the channeling-tool projecting from the slot of the guide-bar and bearing at the other side against the interior of the guide-bar, the channeling-tool having a shank extending to the top of the drill-hole, so as to be driven into the hole in channeling the side thereof, substantially as set forth.

2. The guide-bar having a cylindrical exterior surface and a longitudinal channel in one side thereof, in combination with a channeling-tool fitting loosely into the channel of the guide-bar and having a projecting cutting-edge at one side and bearing at the other side against the bottom of the groove in the guide-bar, substantially as set forth.

Signed by me this 17th day of September, 1891.

GEO. M. GITHENS.

Witnesses:
 GEO. T. PINCKNEY,
 WILLIAM G. MOTT.